United States Patent
Watanabe et al.

(10) Patent No.: US 11,241,912 B2
(45) Date of Patent: Feb. 8, 2022

(54) TIRE COMPRISING A TREAD

(71) Applicant: COMPAGNIE GENERALE DES ETABLISSEMENTS MICHELIN, Clermont-Ferrand (FR)

(72) Inventors: Makiko Watanabe, Tokyo (JP); Hiroko Fukasawa, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 99 days.

(21) Appl. No.: 16/499,693

(22) PCT Filed: Apr. 2, 2018

(86) PCT No.: PCT/JP2018/014040
§ 371 (c)(1),
(2) Date: Sep. 30, 2019

(87) PCT Pub. No.: WO2018/182042
PCT Pub. Date: Oct. 4, 2018

(65) Prior Publication Data
US 2021/0101409 A1    Apr. 8, 2021

(30) Foreign Application Priority Data
Mar. 21, 2017 (WO) .................. PCT/JP2017/013527

(51) Int. Cl.
*C08K 3/36* (2006.01)
*C08L 7/00* (2006.01)
*C08L 9/06* (2006.01)
*C08L 23/22* (2006.01)
*B60C 1/00* (2006.01)

(52) U.S. Cl.
CPC .............. *B60C 1/0016* (2013.01); *C08K 3/36* (2013.01); *C08L 7/00* (2013.01); *C08L 9/06* (2013.01); *C08L 23/22* (2013.01)

(58) Field of Classification Search
None
See application file for complete search history.

(56) References Cited

U.S. PATENT DOCUMENTS

| | | | |
|---|---|---|---|
| 5,830,930 A | 11/1998 | Mahmud et al. | |
| 6,013,718 A | 1/2000 | Cabioch et al. | |
| 6,414,061 B1 | 7/2002 | Cruse et al. | |
| 6,774,255 B1 | 8/2004 | Tardivat et al. | |
| 6,849,754 B2 | 2/2005 | Deschler et al. | |
| 7,217,751 B2 | 5/2007 | Durel et al. | |
| 7,250,463 B2 | 7/2007 | Durel et al. | |
| 7,300,970 B2 | 11/2007 | Durel et al. | |
| 7,488,768 B2 | 2/2009 | Tardivat et al. | |
| 7,491,767 B2 | 2/2009 | Durel et al. | |
| 8,492,475 B2 | 7/2013 | Araujo Da Silva et al. | |
| 8,800,621 B2 | 8/2014 | Miyazaki | |
| 8,957,155 B2 | 2/2015 | Seeboth et al. | |
| 9,010,393 B2 | 4/2015 | Araujo Da Silva et al. | |
| 9,061,548 B2 * | 6/2015 | Miyazaki | C08L 7/00 |
| 9,175,124 B2 | 11/2015 | Chaboche et al. | |
| 2002/0148545 A1 * | 10/2002 | Nanni | B60C 9/22 152/450 |
| 2004/0051210 A1 | 3/2004 | Tardivat et al. | |
| 2004/0129360 A1 | 7/2004 | Vidal | |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2005/0245753 A1 | 11/2005 | Cruse et al. | |
| 2007/0228322 A1 | 10/2007 | Chaves et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2010/0099795 A1 * | 4/2010 | Uesaka | C08L 15/00 523/152 |

(Continued)

FOREIGN PATENT DOCUMENTS

| | | |
|---|---|---|
| EP | 0 778 311 A1 | 6/1997 |
| EP | 2 285 852 | 2/2011 |

(Continued)

OTHER PUBLICATIONS

International Search Report dated Jul. 6, 2018, in corresponding PCT/JP2018/014040 (3 pages).
International Search Report and Written Opinion dated Jul. 4, 2017, in priority application PCT/JP2017/013527 (10 pages).
S. Brunauer, et al., "Adsorption of Gases in Multimolecular Layers", J. Am. Chem. Soc., vol. 60, pp. 309-319 (1938).
Exxon Mobil: "Data Sheet: Escorez (tm) 5600 Tackifying Resin", exxonmobilchemical.com, pp. 1-2, XP002780170, Yetrieved from internet URL: https://exxonmobilchemical.ides.com/en-US/ds243787/Escorez%E2%84%A2%205600. aspx?I=29706&U=1 (2017).

*Primary Examiner* — Peter A Salamon
(74) *Attorney, Agent, or Firm* — Venable LLP

(57) ABSTRACT

A tire having a tread comprising at least two radially superposed portions which comprise a radially external portion intended to come into contact with ground during rolling, the radially external portion being made of a first rubber composition, and a radially internal portion made of a second rubber composition; wherein the first rubber composition is based on at least an elastomer matrix; and a reinforcing filler comprising between 40 and 200 phr of a reinforcing inorganic filler; wherein the second rubber composition is based on at least: an elastomer matrix comprising 20 to 70 phr of a first diene elastomer bearing at least one SiOR function, R being a hydrogen atom or a hydrocarbon radical, 20 to 70 phr of a second diene elastomer which is polyisoprene, and comprising no third diene elastomer or at most 20 phr; a reinforcing filler comprising a reinforcing inorganic filler.

19 Claims, No Drawings

(56) References Cited

U.S. PATENT DOCUMENTS

| | | | |
|---|---|---|---|
| 2010/0099810 A1* | 4/2010 | Nishioka | C08L 21/00 524/502 |
| 2010/0105826 A1* | 4/2010 | Uesaka | C08L 9/06 524/548 |
| 2010/0108213 A1* | 5/2010 | Miyazaki | B60C 1/0041 152/209.5 |
| 2010/0145089 A1 | 6/2010 | Mignani et al. | |
| 2011/0152458 A1 | 6/2011 | Araujo Da Silva et al. | |
| 2011/0178233 A1* | 7/2011 | Chaboche | C08L 53/025 524/571 |
| 2011/0294953 A1* | 12/2011 | Seeboth | C07F 7/1804 525/102 |
| 2012/0024441 A1* | 2/2012 | Ryba | C08L 15/00 152/209.5 |
| 2012/0267026 A1* | 10/2012 | Miyazaki | C08L 7/00 152/537 |
| 2013/0267640 A1* | 10/2013 | Lopez | F24S 25/634 524/322 |
| 2014/0187707 A1* | 7/2014 | Okabe | C08K 3/36 524/526 |
| 2014/0206793 A1* | 7/2014 | Okabe | B60C 1/0016 523/156 |
| 2014/0350138 A1* | 11/2014 | Cladiere | B60C 1/0016 523/156 |
| 2016/0009875 A1* | 1/2016 | Kawai | C08F 16/34 524/575.5 |
| 2016/0159157 A1* | 6/2016 | Jacoby | B60C 1/0016 152/450 |
| 2016/0176992 A1* | 6/2016 | Dire | C08F 236/10 524/572 |
| 2016/0280806 A1* | 9/2016 | Dire | B60C 1/0016 |
| 2016/0297954 A1* | 10/2016 | Sakaki | C08L 9/06 |
| 2016/0319045 A1* | 11/2016 | Dire | C08C 19/44 |
| 2017/0204256 A1* | 7/2017 | Labrunie | C08C 19/12 |
| 2018/0001702 A1* | 1/2018 | Chatard | B60C 1/0016 |
| 2020/0001650 A1* | 1/2020 | Watanabe | C08L 9/00 |
| 2021/0101409 A1* | 4/2021 | Watanabe | C08K 3/36 |

FOREIGN PATENT DOCUMENTS

| | | |
|---|---|---|
| EP | 2 366 557 A1 | 9/2011 |
| EP | 2 412 544 A1 | 2/2012 |
| EP | 3 031 620 A1 | 6/2016 |
| JP | 2005-320371 A | 11/2005 |
| JP | 2007-126523 A | 5/2007 |
| JP | 2010-111753 A | 5/2010 |
| JP | 2013-124328 A | 6/2013 |
| JP | 2013-177632 A | 9/2013 |
| JP | 2015-929 A | 1/2015 |
| JP | 2015-7153 A | 1/2015 |
| JP | 2015-196760 A | 11/2015 |
| JP | 2016-6153 A | 1/2016 |
| JP | 2016-44270 A | 4/2016 |
| WO | 96/37547 A2 | 11/1996 |
| WO | 99/09036 A1 | 2/1999 |
| WO | 99/28380 A1 | 6/1999 |
| WO | 02/31041 A1 | 4/2002 |
| WO | 92/30939 A1 | 4/2002 |
| WO | 92/083782 A1 | 10/2002 |
| WO | 03/002648 A1 | 1/2003 |
| WO | 03/002649 A1 | 1/2003 |
| WO | 03/016387 A1 | 2/2003 |
| WO | 2004/033548 A1 | 4/2004 |
| WO | 2006/023815 A2 | 3/2006 |
| WO | 2006/125532 A1 | 11/2006 |
| WO | 2006/125533 A1 | 11/2006 |
| WO | 2006/125534 A1 | 11/2006 |
| WO | 2007/098080 A2 | 8/2007 |
| WO | 2008/055986 A2 | 5/2008 |
| WO | 2010/072685 A1 | 7/2010 |
| WO | 2015/185394 A1 | 12/2015 |
| WO | 2016/102344 A1 | 6/2016 |
| WO | 2016/140217 A1 | 9/2016 |

* cited by examiner

TIRE COMPRISING A TREAD

TECHNICAL FIELD

The field of the invention is that of rubber compositions for tire treads.

BACKGROUND ART

In recent years, tires which have high grip on paved roads (hereinafter On-road), for instance asphalt roads, have been demanded by users of automobiles and proposed by tire manufacturers.

In parallel, it remains important for tires to be also performant on tracks or unpaved roads (hereinafter Off-road), for instance tracks made of materials such as mud and rocks.

An objective of tire manufacturers is to reconcile performances not only under On-road conditions, but also under Off-road conditions with a single tire product.

SUMMARY OF INVENTION

Technical Problem

During their research, the inventors have discovered that a specific tread composite structure, with external and internal portions having specific rubber compositions allows unexpectedly improved Off-road performance while maintaining On-road performance.

Moreover, the inventors have discovered that the invention additionally allows unexpectedly improved tack of the rubber composition(s) of the tire tread without degrading the On-road performance.

Tack is the ability of rubber composition(s) is to be tacky before curing, and is an important property to the tire building. Indeed, for making tires, it is necessary to be able to apply the different layers of the tire on each other and that these layers stick to each other before curing of the tire, curing which will associate for crosslinking the each layers to others. This property of tack of the composition before curing (vulcanization), is also called "tackiness" or "uncured tack" or "unvulcanized tack" or "green tack".

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

As a tire has a geometry of revolution about an axis of rotation, the geometry of the tire is generally described in a meridian plane containing the axis of rotation of the tire, and the following definitions of directions of the tire are understood in the present application:

A radial direction is a direction perpendicular to the axis of rotation of the tire;

An axial direction is a direction parallel to the axis of rotation of the tire;

A circumferential direction is a direction perpendicular to the meridian plane.

A plane being perpendicular to the axis of rotation of the tire and passing through the middle of a tread surface of the tire is referred to as an equatorial plane of the tire.

In what follows, expressions "radially", "axially" and "circumferentially" respectively mean "in the radial direction", "in the axial direction" and "in the circumferential direction". Expressions "radially on the inside (radially inner or radially internal), or respectively radially on the outside (radially outer or radially external)" mean "closer or, respectively, further away, from the axis of rotation of the tire, in the radial direction, than". Expressions "axially on the inside (axially inner or axially interior) or respectively axially on the outside (axially outer or axially exterior)" mean "closer or, respectively further away, from the equatorial plane, in the axial direction, than". Respective dimensions of a given element in the radial, axial and circumferential directions will also be denoted "radial thickness or height", "axial width" and "circumferential length" of this element. Expression "laterally" means "in the circumferential or axial direction".

Solution to Problem

A first aspect of the invention is a tire having a tread comprising at least two radially superposed portions which comprise a radially external portion intended to come into contact with ground during rolling, the radially external portion being made of a first rubber composition, and a radially internal portion made of a second rubber composition which is different from the first rubber composition;
wherein the first rubber composition is based on at least:
an elastomer matrix; and
a reinforcing filler comprising between 40 and 200 phr, preferably between 50 and 180 phr, more preferably between 60 and 160 phr, still more preferably between 70 and 140 phr, particularly 80 to 120 phr, of a reinforcing inorganic filler; wherein the second rubber composition is based on at least:
an elastomer matrix comprising 20 to 70 phr, preferably 20 to 60 phr, more preferably 20 to 50 phr, of a first diene elastomer bearing at least one SiOR function, R being a hydrogen atom or a hydrocarbon radical, 20 to 70 phr, preferably 20 to 60 phr, more preferably 20 to 50 phr, of a second diene elastomer which is polyisoprene, and comprising no third diene elastomer or equal to or less than 20 phr, preferably equal to or less than 15 phr, of a third diene elastomer, that is, optionally comprising 0 to 20 phr, preferably 0 to 15 phr, of a third diene elastomer;
a reinforcing filler comprising a reinforcing inorganic filler.

Advantageous Effects of Invention

The rubber compositions of the tread of the tire make it possible to improve the Off-road performance with maintaining the Of-road performance.

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the"vinyltoluene" commercial mixture, para-(tert-butyl) styrene, methoxy styrenes, chlorostyrenes, vinylmesitylene, divinylbenzene or vinylnaphthalene.

In the second rubber composition, the first diene elastomer may be selected from the group consisting of polybutadienes (BRs), synthetic polyisoprenes (IRs), natural rubber (NR), butadiene copolymers, isoprene copolymers and the mixtures thereof; such copolymers are selected more preferably from the group consisting of butadiene-styrene copolymers (SBRs) and the mixtures thereof.

In the second rubber composition, the first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution.

In the second rubber composition, the first diene elastomer bears at least one SiOR function, R being a hydrogen atom or a hydrocarbon radical.

Generally, a function borne by an elastomer, particularly a diene elastomer, may be located on the elastomer chain end(s) or may not be located at the elastomer chain ends, that is, may be away from the chain ends. The first case occurs for example when the diene elastomer is prepared using a polymerization initiator bearing the function or using a functionalizing agent. The second case occurs for example when the diene elastomer is modified by the use of a coupling agent or star-branching agent bearing the function.

The expression "hydrocarbon radical" means a monovalent group essentially consisting of carbon and hydrogen atoms. Such a group may comprise at least one heteroatom, and it is known that the assembly formed by the carbon and hydrogen atoms represents the major number fraction in the hydrocarbon radical, for example alkyl or alkoxyalkyl; preferably assembly formed by the carbon and hydrogen atoms represents the entirety of the hydrocarbon radical(s), for example alkyl. Such a SiOR (R is alkyl or alkoxyalkyl) is referred as an "alkoxysilane" function. While, a SiOH (R is a hydrogen atom) is referred as a "silanol" function.

A second aspect of the invention is the tire according to the first aspect, wherein the second rubber composition is such that the first diene elastomer is a styrene-butadiene copolymer (SBR), preferably a solution styrene-butadiene copolymer which is a copolymer of butadiene and styrene, prepared in solution.

A third aspect of the invention is the tire according to the first or the second aspect, wherein the second rubber composition is such that the SiOR function is located at the chain end of the first diene elastomer.

According to a preferred embodiment of the third aspect, in the second rubber composition, the first diene elastomer bearing the SiOR function located at the chain end may be prepared according to the procedure described in a patent EP 0 778 311 B1, for example by reaction of the carbanion at the end of the living elastomeric chain with hexamethylcyclotrisiloxane followed by reaction with a proton donor.

A fourth aspect of the invention is the tire according to the first or the second aspect, wherein the second rubber composition is such that the SiOR function is not located at the chain ends of the first diene elastomer.

According to a first variant of the fourth aspect, the SiOR function borne by the first diene elastomer in the second rubber composition may be a pendant group, which is equivalent to saying that the silicon atom of the SiOR function may not be inserted between the carbon-carbon bonds of the elastomer chain of the first diene elastomer. A diene elastomer bearing a pendant SiOR function may for example be prepared by hydrosilylation of the elastomer chain by a silane bearing an alkoxysilane group, followed by hydrolysis of the alkoxysilane function to give a SiOR function.

According to a second variant of the third aspect, the SiOR function borne by the first diene elastomer in the second rubber composition may not be a pendant group, but may be situated in the elastomer chain, that is, may be within the elastomer chain, which is equivalent to saying that the silicon atom of the SiOR function may be inserted between the carbon-carbon bonds of the elastomer chain of the first diene elastomer. Such a diene elastomer may be prepared according to the procedure described in a patent EP 2 285 852 B1. This second variant is preferential and applies to the fourth aspect.

A fifth aspect of the invention is the tire according to any one of the first to the fourth aspects, wherein the second rubber composition is such that the first diene elastomer further bears at least one amine function, preferably at least one tertiary amine function.

According to a preferred embodiment of the fifth aspect, the amine function borne by the first diene elastomer in the second rubber composition may be a tertiary amine function. Mention will be made, as tertiary amine function, of the amines substituted with $C_1$-$C_{10}$ alkyl radicals, preferably $C_1$-$C_4$ alkyl, more preferably methyl or ethyl radical(s).

According to this embodiment or a preferred embodiment of the fifth aspect, the amine function borne by the first diene elastomer in the second rubber composition may be a pendant group. The pendant position of the amine function means, in a known way, that the nitrogen atom of the amine function may not be inserted between the carbon-carbon bonds of the elastomer chain of the first diene elastomer.

A sixth aspect of the invention is the tire according to the fifth aspect, wherein the second rubber composition is such that the SiOR function bears the amine function.

Such a diene elastomer may result from the modification of a diene elastomer by a coupling agent that introduces, the elastomer chain, an alkoxysilane group bearing an amine function according to the operating procedure described in a patent EP 2 285 852 B1. The following are suitable for example as coupling agent: N,N-dialkylaminopropyltrialkoxysilanes, $C_1$-$C_{10}$, preferably $C_1$-$C_4$, dialkyl groups, the compounds 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane being most particularly preferred, irrespective of the embodiment of the invention.

A seventh aspect of the invention is the tire according to any one of the first to the sixth aspects, wherein the second rubber composition is such that R of the SiOR function is a hydrogen atom.

An eighth aspect of the invention is the tire according to any one of the first to the sixth aspects, wherein the second rubber composition is such that R of the SiOR function is a hydrocarbon radical.

According to a preferred embodiment of the eighth aspect, the hydrocarbon radical may be an alkyl radical, preferably an alkyl radical having 1 to 12 carbon atoms, more preferably a branched, linear or else cyclic alkyl radical having 1 to 12 carbon atoms, still more preferably 1 to 6 carbon atoms, particularly 1 to 4 carbon atoms, more particularly methyl or ethyl radical(s).

A ninth aspect of the invention is the tire according to any one of the first to the eighth aspects, wherein the second rubber composition is such that the first diene elastomer has a glass transition temperature ($Tg_{Dsc}$) of lower than −40° C., (notably between −100° C. and −40° C.), advantageously less than −45° C. (notably between −90° C. and −45° C.).

A tenth aspect of the invention is the tire according to any one of the first to the ninth aspects, wherein the second rubber composition is such that the elastomer matrix comprises 30 to 60 phr, preferably 30 to 50 phr, more preferably 40 to 50 phr, of the first diene elastomer.

In the second rubber composition, the second diene elastomer is a polyisoprene elastomer different from the first diene elastomer.

An eleventh aspect of the invention is the tire according to any one of the first to the tenth aspects, wherein the second rubber composition is such that the elastomer matrix comprises 30 to 60 phr, preferably 30 to 50 phr, more preferably 40 to 50 phr, of the second diene elastomer.

According to a preferred embodiment of the invention, in the second rubber composition, the second diene elastomer may be polyisoprene(s) selected from the group consisting of synthetic polyisoprenes (IRs), natural rubber (NR) and the mixtures thereof. The synthetic polyisoprene(s) may be synthetic cis-1,4-polyisoprene(s), preferably having a content (mol %) of cis-1,4-units of greater than 90%, more preferably of greater than 98%.

A twelfth aspect of the invention is the tire according to any one of the first to the eleventh aspects, wherein the second rubber composition is such that the second diene elastomer comprises more than 50% by weight, preferably 100% by weight, of natural rubber per 100% by weight of the second diene elastomer.

In the second rubber composition, the third diene elastomer is diene elastomer(s) different from the first and the second diene elastomers.

A thirteenth aspect of the invention is the tire according to any one of the first to the twelfth aspects, wherein the second rubber composition is such that the elastomer matrix comprises 5 to 20 phr, preferably 5 to 15 phr, of the third diene elastomer.

A fourteenth aspect of the invention is the tire according to any one of the first to the thirteenth aspects, wherein the second rubber composition is such that the third diene elastomer is a polybutadiene.

According to a preferred embodiment of the fourteenth aspect, in the second rubber composition, the third diene elastomer is polybutadiene(s) having a content (molar %) of 1,2-units of between 4% and 80% or those having a content (molar %) of cis-1,4-units of greater than 80%, preferably greater than 90% (molar %), more preferably greater than or equal to 96% (molar %).

According to a preferred embodiment of the invention, in the first rubber composition, the elastomer matrix may comprise more than 50 phr, preferably more than 70 phr, more preferably more than 90 phr, and up to 100 phr, still more preferably 100 phr, of a first diene elastomer bearing at least one SiOR function, R being a hydrogen atom or a hydrocarbon radical, preferably R being the hydrocarbon radical, and the elastomer matrix may comprise no second diene elastomer or less than 50 phr, preferably less than 30 phr, more preferably less than 10 phr, still more preferably 0 phr, of a second diene elastomer which is different from the first diene elastomer, that is, optionally comprises 0 to less than 50 phr, preferably 0 to less than 30 phr, more preferably 0 to less than 10 phr, still more preferably 0 phr, of the second diene elastomer which is different from the first diene elastomer, preferably the second diene elastomer is selected from the group consisting of polybutadienes, natural rubber, synthetic polyisoprenes, butadiene copolymers, isoprene copolymers, and the mixtures thereof. Particularly, in the first rubber composition, the first diene elastomer may be selected from the group consisting of polybutadienes (BRs), synthetic polyisoprenes (IRs), natural rubber (NR), butadiene copolymers, and the mixtures thereof; such copolymers may be selected more particularly from the group consisting of butadiene-styrene copolymers (SBRs) and the mixtures thereof, still more particularly a styrene-butadiene copolymer (SBR), especially a solution styrene-butadiene copolymer.

According to a more preferred embodiment of this embodiment, the first diene elastomer in the first rubber composition may be same as the first diene elastomer in the second rubber composition.

Each of the first and the second rubber compositions of the tread of the tire according to the invention is based on a reinforcing filler which can reinforce each of these rubber compositions.

The first rubber composition of the tread of the tire according to the invention is based on a reinforcing filler that comprises between 40 and 200 phr of a reinforcing inorganic filler.

According to a preferred embodiment of the invention, in the first rubber composition, the reinforcing filler comprises between 50 and 150 phr, preferably between 60 and 100 phr, more preferably 70 to 90 phr, of the reinforcing inorganic filler.

According to a preferred embodiment of the invention, in the first rubber composition, the reinforcing filler predominately comprises the reinforcing inorganic filler, that means the reinforcing filler may comprise more than 50% by weight of the reinforcing inorganic filler per 100% by weight of the total reinforcing filler. More preferably, the content of reinforcing inorganic filler is more than 60% by weight, still more preferably more than 70% by weight, particularly more than 80% by weight, more particularly more than 90% by weighty, per 100% by weight of the total reinforcing filler. The reinforcing filler may further comprise a reinforcing organic filler (for example, carbon black).

The second rubber composition of the tread of the tire according to the invention is based on a reinforcing filler that comprises a reinforcing inorganic filler.

According to a preferred embodiment of the invention, in the second rubber composition, the reinforcing filler predominately comprises the reinforcing inorganic filler, that means the reinforcing filler may comprise more than 50% by weight of the reinforcing inorganic filler per 100% by weight of the total reinforcing filler. More preferably, the content of reinforcing inorganic filler is more than 55% by weight, still more preferably more than 60% by weight, per 100% by weight of the total reinforcing filler. The reinforcing filler may further comprise a reinforcing organic filler (for example, carbon black).

A fifteenth aspect of the invention is the tire according to any one of the first to the fourteenth aspects, wherein the second rubber composition is such that the reinforcing filler comprises, equal to or more than 10 phr of the reinforcing inorganic filler.

According to a preferred embodiment of the fifteenth aspect, in the second rubber composition, the reinforcing filler comprises 10 to 70 phr, preferably 10 to 60 phr, more preferably 10 to 50 phr, of the reinforcing inorganic filler.

According to a more preferred embodiment of the fifteenth aspect, in the second rubber composition, the reinforcing filler comprises 20 to 70 phr, preferably 20 to 60 phr, more preferably 20 to 50 phr, of the reinforcing inorganic filler.

According to a still more preferred embodiment of the fifteenth aspect, in the second rubber composition, the reinforcing filler comprises 30 to 70 phr, preferably 30 to 60 phr, more preferably 30 to 50 phr of the reinforcing inorganic filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

A sixteenth aspect of the invention is the tire according to any one of the first to the fifteenth aspects, wherein the first and second rubber composition(s) are such that the reinforcing inorganic filler comprises more than 50% by weight, preferably 100% by weight, of silica per 100% by weight of the reinforcing inorganic filler. The reinforcing inorganic filler of the reinforcing filler in the first and the second rubber compositions may comprise a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

The reinforcing inorganic filler used, particularly in case of that it is silica, has a BET surface area and a CTAB specific surface area that are advantageously 50 to 350 $m^2/g$, more advantageously 100 to 300 $m^2/g$, still more preferably between 150 and 250 $m^2/g$.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

According to a preferred embodiment of the invention, in the first rubber composition, the reinforcing filler may further comprise less than 20 phr (for example, between 0.5 and 20 phr), preferably less than 10 phr (for example, between 2 and 10 phr), of carbon black.

According to a preferred embodiment of the invention, in the second rubber composition, the reinforcing filler may further comprise 10 to 40 phr, preferably 15 to 40 phr, more preferably 15 to 35 phr, still more preferably 20 to 30 phr, of carbon black.

Within the ranges indicated, there is a benefit of coloring properties (black pigmentation agent) and anti-UV properties of carbon blacks, without furthermore adversely affecting the typical performance provided by the reinforcing inorganic filler, namely low hysteresis (reduced rolling resistance) and high grip on wet.

According to a preferred embodiment of the invention, in the first rubber composition, the total content of reinforcing filler may be 50 to 200 phr, preferably 60 to 150 phr, more preferably 70 to 100 phr, and/or in the second rubber composition, the total content of reinforcing filler may be 30 to 100 phr, preferably 40 to 90 phr, more preferably 30 to 80 phr, in order to make better balance between reinforcement and processability of the tread of the tire.

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

Z-A-Sx-A-Z, in which:

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

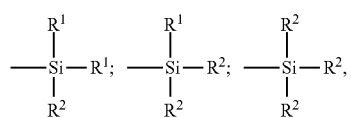

[Chem.1]

in which:
the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2HSO)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane poly-sulphide, of bifunctional POSs (polyorganosiloxanes) or of hydroxysilane polysulphides ($R^2$=OH in the above formula (I)), such as described in patent applications WO 02/30939 (or U.S. Pat. No. 6,774, 255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to a preferred embodiment of the invention, the content of coupling agent may be from 0.5 to 15 wt % relative to the amount of the reinforcing inorganic filler, particularly silica.

According to a preferred embodiment of the invention, the first rubber composition may be based on less than 30 phr (for example, between 0.1 and 30 phr), preferably less than 25 phr (for example, between 0.5 and 25 phr), more preferably less than 20 phr (for example, between 1 and 20 phr), still more preferably less than 15 phr (for example, between 1.5 and 15 phr) of coupling agent.

According to a preferred embodiment of the invention, the second rubber composition may be based on less than 10 phr (for example, between 0.1 and 10 phr), preferably less than 8 phr (for example, between 0.5 and 8 phr), more preferably less than 6 phr (for example, between 1 and 6 phr), of coupling agent.

The rubber compositions (the first and the second rubber compositions) of the treads of the tires in according to the invention may be based on all or a portion(s) of the usual additives generally used in the elastomer compositions intended for the manufacture of treads for tires, such as, for example, protection agents, such as antiozone waxes, chemical antiozonants, antioxidants, plasticizing agent, tackifying resins, methylene acceptors (for example phenolic novolak resin) or methylene donors (for example HMT or H3M hexamethylenetetramine (HMT) or hexamethoxymethylmelamine (H3M)), a crosslinking system based either on sulphur or on donors of sulphur and/or peroxide and/or bismaleimides, vulcanization accelerators, or vulcanization activators.

A seventeenth aspect of the invention is the tire according to any one of the first to the sixteenth aspects, wherein the first and second rubber compositions are further based on a plasticizing agent.

An eighteenth aspect of the invention is the tire according to the seventeenth aspect, wherein the first and the second compositions are such that the plasticizing agent is selected from the group consisting of liquid plasticizer(s), hydrocarbon resin(s) and the mixtures thereof.

According to a preferred embodiment of the eighteenth aspect, in the first rubber composition, the plasticizing agent comprises no liquid plasticizer(s) or equal to or less than 50 phr, that is, 0 to 50 phr, preferably between 0 and 40 phr, more preferably between 5 and 40 phr, of the liquid plasticizer(s).

According to a preferred embodiment of the eighteenth aspect, in the second rubber composition, the plasticizing agent comprises no liquid plasticizer(s) or equal to or less than 30 phr, preferably equal to or less than 25 phr, that is, the plasticizing agent comprises 0 to 30 phr, preferably 0 to 25 phr, more preferably between 0 and 25 phr, still more preferably between 0 and 20 phr, of the liquid plasticizer(s).

Any extending oil, whether of aromatic or non-aromatic nature, any liquid plasticizing agent known for its plasticizing properties with regard to elastomer matrix(es), for instance, diene elastomers, can be used as the liquid plasticizer(s) to soften the matrix by diluting the elastomer and the reinforcing filler. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

According to a preferred embodiment of the eighteenth aspect, in the first and second rubber compositions, the liquid plasticizer(s) are selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof, preferably selected from the group consisting of MES oils, TDAE oils, naphthenic oils, vegetable oils and the mixtures thereof, more preferably selected from the group consisting of MES oils, vegetable oils and the mixtures thereof, still more preferably selected from the group consisting of vegetable oils and the mixtures thereof. The vegetable oil(s) may be made of an oil selected from the group consisting of linseed, safflower, soybean, corn, cottonseed, turnip seed, castor, tung, pine, sunflower, palm, olive, coconut, groundnut and grapeseed oils, and the mixtures thereof, particularly sunflower oil(s), more particularly sunflower oil(s) containing over 60%, still more particularly over 70%, advantageously over 80%, more advantageously over 90%, still more advantageously 100%, by weight of oleic acid.

According to a preferred embodiment of the eighteenth aspect, in the first rubber composition, the plasticizing agent comprises no hydrocarbon resin(s) or equal to or less than 50 phr, that is, 0 to 50 phr, preferably between 0 to 40 phr, more preferably between 5 and 40 phr, of the hydrocarbon resin(s).

According to a preferred embodiment of the eighteenth aspect, in the second rubber composition, the plasticizing agent comprises no hydrocarbon resin(s) or equal to or less than 30 phr, preferably equal to or less than 25 phr, that is, the plasticizing agent comprises 0 to 30 phr, preferably 0 to 25 phr, more preferably between 0 and 25 phr, still more preferably between 0 and 20 phr, of the hydrocarbon resin(s).

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:

a $Tg_{DSC}$ of above 20° C. (for example, between 20° C. and 100° C.), preferably above 30° C. (for example, between 30° C. and 100° C.), more preferably above 40° C. (for example, between 40° C. and 100° C.), still more preferably above 45° C. (for example, between 45° C. and 100° C.), particularly at least 50° C. (for example, at least 50° C. and less than 100° C.);

a number-average molecular weight (Mn) of between 400 and 2000 g/mol (more preferably between 500 and 1500 g/mol);

a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a preferred embodiment of the eighteenth aspect, in the first rubber composition, the hydrocarbon resin(s) are selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as viny-laromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:

polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);

$C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";

limonene/styrene copolymer resins: by DRT under the name "Dercolyte TS 105" or by Arizona Chemical Company under the names "ZT115LT" and "ZT5100".

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

According to a preferred embodiment of the eighteenth aspect, in the first rubber composition, the total content of plasticizing agent is between 0 and 70 phr, preferably 10 to 60 phr, more preferably 20 to 50 phr.

According to a preferred embodiment of the eighteenth aspect, in the second rubber composition, the total content of plasticizing agent is 0 to 30 phr, preferably 5 to 30 phr, more preferably 5 to 25 phr.

Each of the rubber compositions (the first and the second rubber compositions) of the tread of the tire according to the invention may be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

Each of the rubber compositions (the first and the second rubber compositions) of the treads of the tires according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

incorporating in the elastomer matrix(es), for instance, the diene elastomer(s), in a mixer, the reinforcing filler, the plasticizing agent, during a first stage ("non productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), a crosslinking system;

kneading everything up to a maximum temperature of less than 110° C.;

extruding or calendering the rubber composition thus obtained, in particular in the form of a tire tread.

By way of example, the first (non-productive) phase is carried out in a single thermomechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the cros slinking system is then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system proper is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 10.0 phr, and that of the primary accelerator is preferably between 0.5 and 5.0 phr.

Use may be made, as accelerator (primary or secondary) of any compound capable of acting as accelerator of the vulcanization of elastomer matrix(es), for instance, diene elastomers, in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cyclohexyl-2-benzothiazole sulphenamide (abbreviated to "CBS"), N,N-dicyclohexyl-2 benzothiazolesulphenamide ("DCBS"), N-tert-butyl-2-benzothiazolesulphenamide ("TBBS"), N-tert-butyl-2 benzothiazolesulphenimide ("TBSI"), zinc dibenzyldithio-carbamate ("ZBEC"), Tetrabenzylthiuram disulfide ("TBZTD") and the mixtures thereof.

The final composition thus obtained is subsequently calendered, for example in the form of a sheet or of a plaque, in particular for laboratory characterization, or else extruded in the form of a rubber profiled element which can be used directly as each portion of tire tread.

As for making the tire according to the invention, it is possible to build a first layer of a homogeneous rubber composition, as the first rubber composition, and a second layer of another homogeneous rubber composition, as the second rubber composition, then superpose the first layer onto the second layer or sandwich the other layer(s) or portion(s) between the first layer and the second layer to get a raw tread band, and then build and mold a tire. The first layer forming the external portion is radially outer located to the internal portion. Preferably, the first layer is located so as to contact the road in the new state of the tire. The second layer forming the internal portion is radially inner located to the external portion. Preferably, the second layer is adjacent to the external portion.

According to a preferred embodiment of the seventeenth aspect, the internal portion is intended to come into contact with the ground at a latter during the service life of the tire.

According to another preferred embodiment of the seventeenth aspect, the internal portion is not intended to come into contact with the ground during the service life of the tire.

The service life of the tire is usually from the new state to the final state to reach wear bar in case of that the tire is intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

A nineteenth aspect of the invention is the tire according to any one of the first to the eighteenth aspects, wherein the radially internal portion is adjacent to the radially external portion.

The vulcanization (or curing) is carried out in a known way at a temperature generally of between 110° C. and 190° C. for a sufficient time which can vary, for example, between 5 and 90 min depending in particular on the curing temperature, the vulcanization system adopted and the vulcanization kinetics of the composition under consideration.

The invention relates to the rubber compositions, to the treads and the tires described above, both in the raw state (i.e., before curing) and in the cured state (i.e., after croslinking or vulcanization).

The invention is further illustrated by the following non-limiting examples.

EXAMPLE

Six rubber compositions based on a diene elastomer (SBR bearing a SiOR function) or a blend of diene elastomers (SBR bearing a SiOR function, natural rubber as a polyisoprene, and polybutadiene) reinforced with a blend of silica (as a reinforcing inorganic filler) and carbon black were prepared. The formulations of six rubber compositions are given at Table 1 with the content of the various products expressed in phr.

C-1 to C-3: based on a SBR bearing a SiOR function;
C-4 to C-6: based on a blend of SBR bearing a SiOR function, natural rubber and a polybutadiene.

Each rubber composition was produced as follows: The reinforcing filler, its associated coupling agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

As shown in Table 2, the rubber compositions thus prepared were then used as first and second rubber compositions of external/internal portions of treads for five radial carcass passenger vehicle pneumatic tires, with a dimension 265/65R18 (load index:112), denoted respectively by T–1 and T–2 (the reference tires), T–3, T–4 and T–5 (the tires in accordance with the present invention) conventionally manufactured with curing time and pressure conditions and in all respects identical apart from the treads of the tires.

The On-road/Off-road performances of tires measured on arbitrary suitable conditions described in detail below are given in Table 2.

The On-road performances of test tires were obtained from wet/dry grip measurements. The wet grip measurements were conducted on the test tires mounted on a trailer towed by a vehicle at wet surface temperature (about 20° C.). Each of the measurements was in accordance with "UN/ECE (United Nations Economic Commission for Europe) Regulation No. 117 revision 4 concerning the approval of tyres with regard to rolling sound emissions and/or to adhesion on wet surfaces and/or to rolling resistance", that is, on a straight path 1 mm deep wet surface, braking force was applied to each of the test tires at speed of 65 km/h, and then peak µ level was calculated. While, the dry grip measurements were conducted under the same condition as that of the above wet grip measurements except that the measurements were conducted on dry surface. Each value of the On-road performances of test tires was calculated as follows.

On-road performance (T-n)={$\mu_{wet}$(T-n)/$\mu_{wet}$(T-1)+$\mu_{dry}$(T-n)/$\mu_{dry}$(T-1)}/2×100;

wherein:

$\mu_{wet}$: Peak µ on the wet grip measurement;
$\mu_{dry}$: Peak µ on the dry grip measurement;
n: 1, 2, 3, 4 and 5.

The value greater than that of one of the reference tires (T-1), arbitrarily set to 100, indicates improved the On-road performance.

The Off-road performances of test tires were qualitatively evaluated by a professional driver with a vehicle (Toyota Land Cruiser, wheel: 8J18, tire inflation pressure: 2.3 bar). The professional driver assigned a qualitative overall mark for road behavior of the vehicle—and therefore of the tires—on mud and rock circuits; a mark greater than that of one of the reference tires (T-1), arbitrarily set to 100, indicates improved the Off-road performance.

Moreover, the measurements of tack were conducted with the mixing films obtained by calendaring the unvulcanized mixtures of the second rubber compositions of the tires (T-1 to T-5). A test device based on the probe tack tester (ASTM D2979-95) was used. An Instron tensile test machine comprising a fixed metallic jaw and a mobile metallic jaw was used. A first test specimen was stuck on the fixed metallic jaw. A second test specimen was stuck to the mobile jaw. The test specimens were cut into circular plates with a 45 mm diameter punch. The test specimens were made of mixing films on which plastic films were put in order to reinforce the mixing films. The mixing films were obtained by calendaring the unvulcanized mixtures with a thickness of 2 mm.

The principle of the measurement consisted in bringing the two mixing films into contact for 5 seconds by applying a compression force of 20 N. After this contact phase, the two mixing films were separated by driving the cross-member of the tensile test machine. The speed of displacement of the cross-member in this peeling phase was 1 mm/s. The displacement of the cross-member and the force were measured continuously as a function of time from the contact phase to the peeling phase.

Each result of tack is the measurement of the maximum force reached during the peeling. The results are expressed in base 100, that is to say that the value 100 is arbitrarily assigned to the second rubber composition of one of the reference tires (T-2), and the values of the second rubber compositions of the test tires are shown in Table 2. The higher the value is, the higher (stronger) the tack is.

The results from Table 2 demonstrate that the tires T-3, T-4 and T-5 according to the invention show better Off-road performances than that of the reference tires (T-1 and T-2), and exhibit same or improved On-road performance(s) in compared with the references. Moreover, the second rubber compositions of tires T-3, T-4 and T-5 according to the invention show higher tack than that of the references.

Additionally, as shown in Tables 3 and 4, four radial carcass passenger vehicle pneumatic tires according to the invention (T-6 to T-9), with a 215/55R17 (load index: 94), having treads that comprise external/internal portions made of first/second compositions selected from four rubber compositions (C-7 to C-10) were similarly manufactured and measured to the other tires (T-1 to T-5). The measurements were On-road performance and tack only, and the results are expressed in base 100, that is to say that the value 100 is arbitrarily assigned to T-6 or the second rubber composition of the tread of T-6.

In Table 4 which mentions the results of the tires (T-6 to T-9) according to the invention, there is no degradation of the On-road performance with the improvement of tack performance.

In conclusion, the rubber compositions of the tread of the tire according to the invention make possible an improvement of Off-road performance while maintaining On-road performance.

Moreover, the rubber compositions of the tread of the tire according to the invention make possible an improvement of tack of the rubber composition(s) of the tread of the tire without degrading the On-road performance.

TABLE 1

|  | C-1 | C-2 | C-3 | C-4 | C-5 | C-6 |
|---|---|---|---|---|---|---|
| SBR1 (1) | 100 |  |  | 45 |  |  |
| SBR2 (2) |  | 100 | 100 |  | 45 | 45 |
| NR (3) |  |  |  | 45 | 45 | 45 |
| BR (4) |  |  |  | 10 | 10 | 10 |
| Carbon black (5) | 3 | 3 | 3 | 25 | 25 | 25 |
| Silica (6) | 65 | 65 | 85 | 35 | 35 | 40 |
| Coupling agent (7) | 5.2 | 5.2 | 6.8 | 2.8 | 2.8 | 3.2 |
| Liquid plasticizer (8) | 20 | 20 | 25 | 10 | 10 | 15 |
| Hydrocarbon resin (9) | 10 | 10 | 15 | 5 | 5 | 5 |
| Resin-OPRT (10) |  |  |  | 3 | 3 | 3 |
| ZnO | 2 | 2 | 2 | 2 | 2 | 2 |
| Stearic acid | 1.5 | 1.5 | 1.5 | 1.5 | 1.5 | 1.5 |
| Antiozone wax | 1.5 | 1.5 | 1.5 | 1.5 | 1.5 | 1.5 |
| Antioxidant (11) | 2.5 | 2.5 | 2.5 | 2.5 | 2.5 | 2.5 |
| DPG (12) | 1 | 1 | 1 | 1 | 1 | 1 |
| Sulphur | 1.5 | 1.5 | 1.5 | 5 | 5 | 5 |
| Accelerator (13) | 2 | 2 | 2 | 2 | 2 | 2 |

(1) SBR1: Solution SBR with 27% of styrene unit and 24% of unit 1.2 of the butadiene part ($Tg_{DSC}$=−48° C.) bearing a SiOR function, R being a hydrogen atom, the SiOR being dimethylsilanol function at the end of the elastomer chain, the SBR prepared according to a process described in a patent EP 0 778 311 B1;
(2) SBR2: Solution SBR with 27% of styrene unit and 24% of unit 1.2 of the butadiene part ($Tg_{DSC}$=−48° C.) bearing a SiOR function, R being a methyl radical, the SiOR function not located at the ends of the elastomer chain; wherein the silicon atom of the SiOR function is inserted between the carbon-carbon bonds of the elastomer chain; the SBR further bearing a tertiary amine function made of the amine substituted with two methyl radicals; wherein the nitrogen atom of the amine function is not inserted between the carbon-carbon of the elastomer chain, and the SiOR function bears the amine function; the SBR prepared according to a process described in a patent EP 2 285 852 B1;
(3) NR: Natural rubber (peptised);
(4) BR: BR with 0.3% of 1.2 vinyl; 2.7% of trans; 97% of cis-1.4 ($Tg_{DSC}$=−105° C.);
(5) Carbon black: Carbon black (ASTM grade N234 from Cabot);
(6) Silica: Silica ("Zeosil 1165MP" from Rhodia (CTAB, BET: about 160 m$^2$/g));
(7) Coupling agent TESPT ("Si69" from Evonik);
(8) Oleic sunflower oil ("Agripure 80" from Cargill, Weight percent oleic acid: 100%);
(9) Cycloaliphatic hydrocarbon resins ("ESCOREZ5600" from ExxonMobil, $Tg_{DSC}$=52° C.);
(10) Octyl-substituted phenol-formaldehyde resin;

(11) N-(1,3-dimethylbutyl)-N-phenyl-para-phenylenediamine ("Santoflex 6-PPD" from Flexsys);
(12) Diphenylguanidine ("Perkacit DPG" from Flexsys);
(13) Mixtures of N-dicyclohexyl-2-benzothiazolesulphenamide ("Santocure CBS" from Flexsys) and 2-mercaptobenzothiazyl disulphide ("Perkacit MBTS" from Flexsys).

TABLE 2

|  | T-1 | T-2 | T-3 | T-4 | T-5 |
|---|---|---|---|---|---|
| First rubber composition | C-1 | C-4 | C-1 | C-2 | C-3 |
| Second rubber composition | C-1 | C-4 | C-4 | C-5 | C-6 |
| On-road performance | 100 | 90 | 100 | 101 | 103 |
| Off-road performance | 100 | 110 | 120 | 125 | 145 |
| Average performance (On/Off-road) | 100 | 100 | 110 | 113 | 124 |
| Tack | 38 | 100 | 100 | 115 | 133 |
| Average performance (On-road/Tack) | 69 | 95 | 100 | 108 | 118 |

TABLE 3

|  | C-7 | C-8 | C-9 | C-10 |
|---|---|---|---|---|
| SBR1 (1) | 100 |  | 45 |  |
| SBR2 (2) |  | 100 |  | 45 |
| NR (3) |  |  | 45 | 45 |
| BR (4) |  |  | 10 | 10 |
| Carbon black (5) | 3 | 3 | 25 | 25 |
| Silica (6) | 80 | 80 | 40 | 40 |
| Coupling agent (7) | 6.4 | 6.4 | 3.2 | 3.2 |
| Liquid plasticizer (8) | 10 | 10 | 5 | 5 |
| Hydrocarbon resin (9) | 30 | 30 | 15 | 15 |
| Resin-OPRT (10) |  |  | 3 | 3 |
| ZnO | 2 | 2 | 2 | 2 |
| Stearic acid | 1.5 | 1.5 | 1.5 | 1.5 |
| Antiozone wax | 1.5 | 1.5 | 1.5 | 1.5 |
| Antioxidant (11) | 2.5 | 2.5 | 2.5 | 2.5 |
| DPG (12) | 1 | 1 | 1 | 1 |
| Sulphur | 1.5 | 1.5 | 5 | 5 |
| Accelerator (13) | 2 | 2 | 2 | 2 |

TABLE 4

|  | T-6 | T-7 | T-8 | T-9 |
|---|---|---|---|---|
| First rubber composition | C-7 | C-8 | C-7 | C-8 |
| Second rubber composition | C-9 | C-9 | C-10 | C-10 |
| On-road performance | 100 | 100 | 100 | 100 |
| Tack | 100 | 100 | 116 | 142 |
| Average performance (On-road/Tack) | 100 | 100 | 108 | 121 |

The invention claimed is:

1. A tire having a tread comprising at least two radially superposed portions which comprise a radially external portion intended to come into contact with ground during rolling, the radially external portion being made of a first rubber composition, and a radially internal portion made of a second rubber composition which is different from the first rubber composition,
   wherein the first rubber composition is based on at least:
      an elastomer matrix; and
      a reinforcing filler comprising between 40 and 200 phr of a reinforcing inorganic filler, and
   wherein the second rubber composition is based on at least:
      an elastomer matrix comprising 20 to 70 phr of a first diene elastomer bearing at least one SiOR function, R being a hydrogen atom or a hydrocarbon radical, 20 to 70 phr of a second diene elastomer which is polyisoprene, and comprising no third diene elastomer or equal to or less than 20 phr of a third diene elastomer; and
      a reinforcing filler comprising a reinforcing inorganic filler.

2. The tire according to claim 1, wherein the first diene elastomer is a styrene-butadiene copolymer.

3. The tire according to claim 1, wherein the at least one SiOR function is located at the chain end of the first diene elastomer.

4. The tire according to claim 1, where the at least one SiOR function is not located at the chain end of the first diene elastomer.

5. The tire according to claim 1, wherein the first diene elastomer further bears at least one amine function.

6. The tire according to claim 5, wherein the at least one SiOR function bears the amine function.

7. The tire according to claim 1, wherein R of the at least one SiOR function is a hydrogen atom.

8. The tire according to claim 1, wherein R of the at least one SiOR function is a hydrocarbon radical.

9. The tire according to claim 1, wherein the first diene elastomer has a glass transition temperature of lower than −40° C.

10. The tire according to claim 1, wherein the elastomer matrix of the second rubber composition comprises 30 to 60 phr of the first diene elastomer.

11. The tire according to claim 1, wherein the elastomer matrix of the second rubber composition comprises 30 to 60 phr of the second diene elastomer.

12. The tire according to claim 1, wherein the second diene elastomer comprises more than 50% by weight of natural rubber per 100% by weight of the second diene elastomer.

13. The tire according to claim 1, wherein the elastomer matrix of the second rubber composition comprises 5 to 20 phr of the third diene elastomer.

14. The tire according to claim 1, wherein the elastomer matrix of the second rubber composition comprises the third diene elastomer is a polybutadiene.

15. The tire according to claim 1, wherein the reinforcing filler of the second rubber composition comprises equal to or more than 10 phr of the reinforcing inorganic filler.

16. The tire according to claim 1, wherein the reinforcing inorganic filler comprises more than 50% by weight of silica per 100% by weight of the reinforcing inorganic filler in each of the first and second rubber compositions.

17. The tire according to claim 1, wherein the first and second rubber compositions are further based on a plasticizing agent.

18. The tire according to claim 17, wherein the plasticizing agent for each of the first and second rubber compositions is independently selected from the group consisting of liquid plasticizers, hydrocarbon resins, and mixtures thereof.

19. The tire according to claim 1, wherein the radially internal portion is adjacent to the radially external portion.

* * * * *